June 15, 1948.   M. A. ACHESON ET AL   2,443,528
ELECTRON DISCHARGE TUBE
Filed Nov. 3, 1944

MARCUS A. ACHESON
PAUL HAAS
INVENTORS

BY John J. Rogan
ATTORNEY

Patented June 15, 1948

2,443,528

UNITED STATES PATENT OFFICE 2,443,528

ELECTRON DISCHARGE TUBE

Marcus A. Acheson and Paul Haas, Emporium, Pa., assignors to Sylvania Electric Products Inc., Emporium, Pa., a corporation of Massachusetts Application November 3, 1944, Serial No. 561,666

3 Claims. (Cl. 250—27.5)

This invention refers to electron discharge tubes, and more particularly to discharge tubes with an external glass press, as distinguished from the usual reentrant glass press constructions.

It is an object of this invention to increase the rigidity of the mount of an electron tube whose support leads are sealed into a glass envelope without the necessity of manufacturing the stem or header as a separate unit.

It is another object of the invention to provide a multiple pillar mount supporting construction in conjunction with an external press, whereby a considerable reduction of the tube length, and, as a corollary, a further reduction of the lead-in capacities and an unusually high augmentation of the shock resistivity is obtained.

The unexpected increase of shock resistance of tubes constructed according to the invention is best illustrated by a few numerical values. Shock resistance is usually measured in terms of multiples of the acceleration G, of gravity at the surface of the earth, where G=10 meters/sec. sec. very nearly. The stock resistance required, e. g., for airplane wings is of the order of 10 G. The "G test" consists in a sudden flattening into horizontal direction of an airplane from a power dive, the vertical deceleration of the plane during this operation being about 100 m./sec. sec., or, shortly "ten G." In ordinary radio tubes, shock resistance is measured in a number of ways, including acceleration tests which a tube must meet without changing its electrical characteristics. In one of the standard tests the acceleration is imparted to the tube by attaching it to a rotating disc, and its shock resistance is measured in terms of centrifugal acceleration. In another testing method, the tube is rigidly mounted on a vibrating table, which is oscillated with a given angular velocity $\omega$ and amplitude A. Its acceleration "a" is $a = d^2x/dt^2 = -A^2 \cos \omega t$ and $a_{max} = |A^2|$.

In either case, the acceleration is proportional to the square of the angular velocity, and to a length which may be either the radius of the rotating periphery or the amplitude of the vibration. Acceleration values which a tube will withstand obtained in this manner provide a convenient method for determining the shock resistance of a tube from a few hundred G to the order of 10,000 to 100,000 G.

Shock resistance is an important requirement where the tubes are used in hearing aid sets, which are subject to being dropped on the floor; or in portable radio sets. The required shock resistance of tubes for these applications is of the order of 20 to 30 G. Heretofore the maximum obtainable was 200 G. Higher shock resistances are needed in discharge tubes used under battle conditions, and the requirements for this purpose have been increased from several hundred G to the order of 100,000 G, depending on the specific conditions under which the tubes are supposed to operate.

It is, therefore, a principal object of the invention to provide an electron discharge tube which will not change its operating characteristics when exposed to shocks of more than 10,000 G up to 100,000 G.

It is another principal object of the invention to provide a tube of extreme lightness and of very small dimensions, which is also highly resistant to shock.

A feature of the invention relates to an electron discharge tube which combines low interelectrode lead capacities with a rigidly supported mount structure.

A further object of the invention is to provide a discharge tube containing a tube mount having transverse rigidity in a plurality of directions perpendicular to the tube axis, which rigidity is considerably larger than that obtainable with previously known tubes.

A number of advantages result furthermore, from the application of an external stem over that of the older, conventional "re-entrant" press, in the production and manufacture of discharge tubes having glass envelopes. One of them is, that the undesirable reheating of glass parts is eliminated, which reheating is a necessary concomitant where a preformed glass stem is to be sealed to a preformed glass envelope. It is possible also, to reduce the oxidation of the tube elements, as compared with the oxidation resulting from the conventional "sealing-in" of a tube mount carried by a glass header into its glass envelope. In all cases, where it is desired to reduce the overall length and the transverse dimensions of a discharge tube, the external press according to the invention offers great advantages.

Heretofore, tubes of the type having an external press were used occasionally, but this external press was restricted to a pinch in a single plane, which fails to incorporate the transverse mechanical strength obtainable by a multiple-winged press. The multiple-winged press, on the other hand, as known in the art for more than 16 years, requires complicated machinery and its commercial use was therefore restricted to an internal or re-entrant press, which is made as a separate unit, independent of and prior to attaching it to the electrode assembly which is conventionally done later on as subsequent step in the tube manufacturing operations.

A careful investigation shows that in tubes made according to this invention, an entirely unexpected increase of shock resistance is obtainable, e. g., of from 50 to 500 times larger than formerly obtainable. While the demand for the vastly increased shock resistance of electron tubes has existed for several years, this demand could not be filled prior to this new construction, regardless of the fact that the reentrant multiple wing press and the external flat press were well-known for nearly 20 years.

The invention will now be described in connection with the drawing, in which

Figure 1:
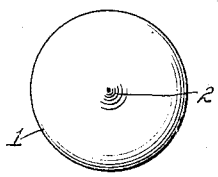
Fig. 1 shows a top plan view of a tube according to the invention.
Figure 2:
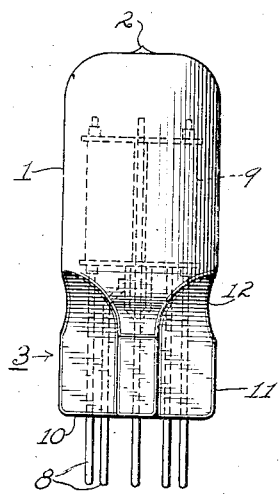
Fig. 2 shows a side view of the same tube.
Figure 3:
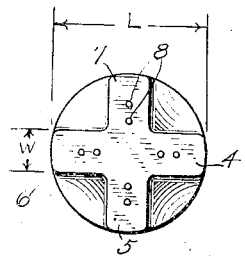
Fig. 3 shows a bottom view of the tube.

As shown in the drawing, the tube comprises a substantially cylindrical glass envelope 1 having a tipped-off exhaust tubulation 2 at its upper end, and a four-winged stem 3 at its lower end. The four radially extending wings 4, 5, 6 and 7 are molded from the lower angular lip of the same glass tube which constitutes the envelope 1. This portion of the glass tube is also molded around and between the lead-in and supporting wires 8 of which there are shown two lead-in wires sealed through each individual wing of the stem. These lead-in wires extend through the stem interiorly of the envelope 1 and support any well-known tube mount or electrode assembly 9 which may include at least a cathode and an anode. For a detailed description of the method of assembling the mount and lead-in wires, reference may be had to U. S. Patent 2,338,507. Preferably the molding is effected so that the extreme lower surfaces 10 of the four wings are substantially flat and lies in substantially the same plane. The cross sectional width W of each wing is substantially greater than the cross section of the lead-ins. The lateral faces 11 of each wing are also preferably flat and merge through smoothly curved surfaces 12 into the cylindrical section of the envelope 1, which may be highly evacuated or may contain an atmosphere of a rare gas or gases at low pressure. The length of wire between electrode assembly 9 and the point at which wires 8 enter wings 4, 5, 6 and 7 is seen in Fig. 2 to be short; for an excessive length of lead would undermine the high shock resistance achieved by the construction described. The length of wire between mount or electrode assembly 9 and the seal of the wire in glass is also seen to be smaller than the spacing between the outermost wires 8.

While the drawing shows a four-wing-external stem, it is of course understood, that the invention covers as well the external stem having only three wings, or having five or more wings, depending on the number or adequacy of the element supports desired for the electrode assembly or, as otherwise known, the mount. Each wing may contain one or more sealed-in wires either for electrode supports, or as lead-ins, or as both supports and lead-ins.

Preferably, the number of wings is an even number, and the wings are arranged in a star having equal angles between themselves. In special cases, the wings may, however, be arranged so as to include different angles between neighboring radial vanes. As an example, two of the wings of a three-wing stem may include an angle of 160°, and the third wing may be orientated with respect to the two others at 100°, or the structure may even be entirely unsymmetrical, filling the available 360° in any manner convenient for a certain application. It will be understood, of course, that the invention is not necessarily limited to a tube having a cylindrical section 1 for the envelope, as that section may be spherical or any other desired shape. However in the case of a cylindrical envelope the cost and ease of manufacture is greatly decreased since standard tubular glass bodies may be used for the envelope and integrally molded wing stem.

While the invention has been described as applied to electron discharge tubes, it is equally applicable to ballast tubes, hydrogen resistors, mercury switches, and other electrical devices similarly having unitary internal electrode assemblies, and having similar applications as the above described electron devices.

What is claimed is:

1. An electron discharge device comprising an envelope one end of which is in the form of a plurality of external intersecting wings, wires sealed in more than two of said wings, and a unitary electrode mount enclosed within said envelope and secured to said wires at points reasonably close to their respective seals in said wings, thus to impart rigidity in intersecting transverse directions.

2. An electron discharge device comprising an envelope one end of which is in the form of a plurality of external intersecting wings, wires sealed in more than two of said wings, and an electrode assembly enclosed within said envelope and secured to said wires, the length of wire between said electrode assembly and the point at which said wires enter said wings being less than the spacing between the outermost ones of said wires.

3. An electron discharge device comprising an envelope generally symmetrical about an axis and having one end formed into a plurality of external intersecting wings, wires sealed in more than two of said wings and extending parallel to the axis of said envelope, and an electrode assembly secured to said wires reasonably near the points where said wires enter said wings, said electrode assembly extending from said wires along the axis of said envelope.

MARCUS A. ACHESON.
PAUL HAAS.

REFERENCES CITED

The following references are of record in the file of this patent:

UNITED STATES PATENTS

| Number | Name | Date |
| --- | --- | --- |
| D. 127,826 | Hoffman | June 17, 1941 |
| 1,566,293 | Van der Bijl | Dec. 22, 1925 |
| 1,936,094 | McCabe | Nov. 21, 1933 |
| 2,057,305 | Lyle | Oct. 13, 1936 |
| 2,330,838 | Nelson | Oct. 5, 1943 |

FOREIGN PATENTS

| Number | Country | Date |
| --- | --- | --- |
| 283,078 | Italy | Feb. 28, 1931 |
| 341,901 | Italy | July 6, 1936 |